US006929424B2

(12) United States Patent
Hindle (10) Patent No.: US 6,929,424 B2
(45) Date of Patent: Aug. 16, 2005

(54) ROCK BOLT AND METHOD OF USE (75) Inventor: David John Hindle, London (GB)

(73) Assignee: Romtech Limited, Cannock (GB)

( * ) Notice: Subject to any disclaimer, the term of this patent is extended or adjusted under 35 U.S.C. 154(b) by 0 days.

(21) Appl. No.: 10/479,536

(22) PCT Filed: Jun. 3, 2002

(86) PCT No.: PCT/IB02/01974

§ 371 (c)(1),
(2), (4) Date: Dec. 3, 2003

(87) PCT Pub. No.: WO02/099251

PCT Pub. Date: Dec. 12, 2002

(65) Prior Publication Data

US 2004/0136788 A1 Jul. 15, 2004

(30) Foreign Application Priority Data

Jun. 4, 2001 (GB) ............................................. 0113479
May 13, 2002 (GB) ............................................. 0210882

(51) Int. Cl.[7] ............................................. E21D 20/00
(52) U.S. Cl. ............................... 405/259.1; 405/259.4; 52/706; 411/34
(58) Field of Search ......................... 405/259.1, 259.2, 405/259.4; 52/698, 703; 411/34, 38

(56) References Cited

U.S. PATENT DOCUMENTS

| 1,295,734 | A | * | 2/1919 | Greubel | 411/38 |
| 1,431,176 | A |   | 10/1922 | Ogden |  |
| 2,150,866 | A | * | 3/1939 | Sipe | 411/34 |
| 2,269,646 | A | * | 1/1942 | Burke | 405/244 |
| 3,651,651 | A | * | 3/1972 | Triplett | 405/259.3 |
| 3,888,156 | A | * | 6/1975 | Fima | 411/38 |
| 4,415,294 | A | * | 11/1983 | Ringe | 405/259.1 |
| 4,472,088 | A |   | 9/1984 | Martin |  |
| 4,714,391 | A |   | 12/1987 | Bergner |  |
| 4,789,285 | A | * | 12/1988 | Fischer | 411/32 |
| 5,219,248 | A | * | 6/1993 | Wright | 405/259.4 |
| 5,509,765 | A | * | 4/1996 | Albin | 411/38 |
| 5,690,454 | A | * | 11/1997 | Smith | 411/30 |
| 5,791,823 | A |   | 8/1998 | Blakley et al. |  |
| 6,609,866 | B2 | * | 8/2003 | Huang et al. | 411/34 |

FOREIGN PATENT DOCUMENTS

| EP | 161916 | * | 11/1985 |
| GB | 1 252 568 |  | 11/1971 |
| GB | 2153475 | * | 8/1985 |
| SU | 1283411 A1 |  | 7/1985 |
| WO | WO 88/04355 |  | 6/1988 |

* cited by examiner

Primary Examiner—Jong-Suk Lee
(74) Attorney, Agent, or Firm—Steven J. Hultquist; Marianne Fuierer; Tristan Fuierer (57) ABSTRACT A rock bolt comprising an elongated bar and an elongated deformable member, with a threaded nut to reduce the distance between the respective ends of the deformable member so as to deform at least part of the member away from the bar. The threaded nut may be located at the distal end of the rock bolt or the proximal end thereof. Though the term "rack bolt" is used, the bolt may be used as a ground anchor, or in other suitable applications, in which it is located in a hole drilled into earth as well as or instead of rock.

11 Claims, 4 Drawing Sheets

ROCK BOLT AND METHOD OF USE

CROSS-REFERENCE TO RELATED APPLICATION

This application as a national stage of PCT/IB02/01974 filed Jun. 3, 2004 and based on United Kingdom Patent Application 0113479.0 filed Jun. 4, 2001 and United Kingdom Patent Application 0210882.7 filed May 13, 2002.

FIELD OF THE INVENTION

This invention relates to a rock bolt and to its method of use.

BACKGROUND TO THE INVENTION

Rock bolts are commonly used in tunnelling or mining to support a rock face and/or to provide an anchorage point adjacent the rock face within the tunnel or mine. Rock bolts comprise elongated bolts which are fitted into holes drilled into a rock face. The rock bolt may be several metres long, the length depending upon the type and condition of the rock. Rock bolts are typically used to support the rock above a ceiling of a tunnel or chamber, but may alternatively be used to support the rock behind a wall thereof.

DESCRIPTION OF THE PRIOR ART

Many different types of rock bolt are known. Possibly the most common type is a bar of solid metal which is threaded adjacent its proximal end. The bar often has a roughened or deformed outer surface and is inserted into a hole which has been pre-drilled into the rock face. The hole is somewhat larger than the diameter of the bar, and before insertion of the bolt a cement-based or resin grout is inserted into the hole. When the rock bolt is subsequently pressed into the hole the grout substantially fills the gap between the bolt and the hole, and when the grout has set this secures the bolt within the hole.

When the grout has hardened, a face plate is fitted over the proximal end of the bolt, and a nut applied to the threads thereof in order to clamp the face plate against the rock face. The nut and face plate will typically have corresponding part-circular formations to permit the face plate to lie other than perpendicular to the bolt, since the surface of the rock adjacent the proximal end of the bolt may be other than perpendicular to the bolt.

It is a recognised disadvantage of this type of rock bolt that tension cannot be applied between its ends, i.e. along the whole length of the bolt. In other words the rock bolt cannot clamp, or apply compression to, the rock between its distal end and the face plate. Such clamping is desired if the rock is soft, or is highly fractured or jointed, and the rock face is liable to movement or subsidence.

In order to enable tension to be applied to substantially the whole length of the bolt it is known to provide a two-stage setting resin grout system in place of the cement-based grout or the single-stage setting resin grout described above. The resin grout comprises a combination of two chemicals which harden after being mixed together. The chemicals are provided in cartridges in an unmixed state, and the cartridges are inserted into the pre-drilled hole prior to the insertion of the bolt. The bolt is subsequently inserted into the hole and ruptures the cartridges of resin, the bolt being rotated as it is inserted to mix the chemicals together. When using the two-stage setting resin grout system it is arranged that several cartridges are used in the hole and the compositions of the chemicals vary between the cartridges. In this way, it can be arranged that the resin adjacent the distal end of the hole hardens quickly, whilst the resin adjacent the proximal end of the hole hardens more slowly. Accordingly, tension can be applied to a greater length of the bolt by tightening (or partially-tightening) the nut against the face plate as soon as the resin adjacent the distal end has hardened, and before the resin adjacent the proximal end has hardened.

It is another known disadvantage of both of these designs that the separate insertion of the grout and bolt is a time consuming procedure and is also messy. In addition, some means needs to be provided to retain the bolt within the hole whilst the grout hardens. Furthermore, these methods are not always able to accommodate voids created adjacent the hole, i.e. where the cross-section of the hole is locally larger than the drill diameter because of the displacement of rock during the drilling procedure, or natural cavities within the rock.

In addition, the rock adjacent the hole can move (and perhaps block the hole) during the time between extraction of the drill and insertion of the bolt, the time taken to insert the grout delaying the insertion of the bolt. If the rock moves significantly and blocks the hole, a new hole will need to be drilled.

Another design of rock bolt is known in which a locking shell is fitted to the distal end of the bolt, the locking shell being mounted in threaded engagement with the bolt; following insertion of the bolt (with a loosely-fitted shell) the bolt is rotated relative to the shell so as to cause the shell to be expanded into secure engagement with the surrounding rock. Whilst such rock bolts avoid the requirement for grout, they are not in widespread use since the failure of the shell to bind with the rock (and so simply rotate with the bolt) is commonplace.

Two alternative types of rock bolt have been designed, which also avoid the requirement for grout. Avoiding the requirement for grout reduces the time taken to fit the rock bolt, which is beneficial in itself, and also reduces the likelihood of the rock adjacent the hole becoming displaced and blocking the hole prior to insertion of the bolt. The avoidance of grout also makes the fitment of a rock bolt a cleaner and tidier job.

One of the alternative designs of rock bolt is made and sold by Ingersoll Rand, and is referred to as "Split Set"(™). The bolt comprises a tube of high strength steel which has a slot running along its length to provide a C-shaped cross section. The bolt is resiliently deformable, i.e. the diameter can be reduced by closing up the slot, and the resilience of the bolt will seek to open up the slot and increase the diameter. The hole drilled in the rock face is sized to be smaller than the rest condition of the bolt, so that when the bolt has been inserted its resilience results in a frictional engagement with the hole.

Another alternative is the "Swellex"(™) rock bolt manufactured by Atlas-Copco. The bolt comprises a tube of ductile steel which is deformed by being partially folded within itself so as to reduce its effective diameter by around 40%. The hole drilled in the rock face is arranged to be of larger diameter than the deformed tube, but of smaller diameter than the enlarged tube. Following insertion of the deformed tube into the hole, pressurised fluid (typically water) is passed into the tube, causing it to unfold itself and expand into contact with the wall of the hole.

Both of the "Split set" and "Swellex" rock bolts are in widespread use, and are distinguished by the speed with which they may be inserted into a drilled hole; despite the piece cost penalty over many of the other designs of rock bolt, they can offer a reduced cost overall when the time of installation is taken into account.

However, both of these alternative designs have their own disadvantages. Firstly, they are both susceptible to corrosion damage since in each case the metal of which they are made is in intimate contact with the rock surrounding the hole. In addition, the load which the "Split set" design can withstand is limited by the resilience of the tube. The "Swellex" design on the other hand can withstand greater loads, but requires a source of pressurised water which complicates the procedure involved in fitment of the bolt.

Neither of these alternative designs can have tension applied between its ends so as to clamp the rock therebetween.

Also, neither of the alternative designs is able to cope well with voids which have a greater cross-section than the diameter of the "Split set" tube (when relaxed) or the "Swellex" tube when fully expanded. Accordingly, these designs of rock bolt will provide little or no support adjacent such a void, and there will be no way of knowing that such a void exists, or the extent (length) of such a void as a proportion of the overall length of the bolt. Thus, a fitted bolt of the "Split set" or "Swellex" type may provide a significantly reduced load capacity because of a void along a significant proportion of the length of the bolt, without the operator being aware of this.

SUMMARY OF THE INVENTION

The present invention seeks to provide a rock bolt which shares the advantages of the alternative designs discussed above in terms of speed and ease of fitment, and yet which reduces or avoids their stated disadvantages.

According to the invention therefore, there is provided a rock bolt comprising an elongated tensile member and an elongated deformable member, with means to reduce the distance between the respective ends of the deformable member so as to deform at least part of the deformable member away from the tensile member.

The ability of the deformable member to be deformed away from the tensile member enables it to engage the side of the hole which has been drilled into the rock (and which hole is of slightly larger cross-section than the bar and undeformed member).

Preferably the deformable member is almost as long as the tensile member, and the deformation can occur over substantially the full length of the deformable member. In this way, the deformable member can be deformed into engagement with the surface of a hole over substantially the full length of the hole.

The tensile member and the deformable member may be respective bars of metal or other suitable material.

Preferably there is more than one deformable member, each member being deformable as the distance between its respective ends is reduced.

Preferably also the deformable members have buckling zones provided therein, to induce buckling deformation at certain locations of the member. Since in practice adjacent buckling zones will likely buckle in opposed directions, the distance between adjacent buckling zones can determine the maximum distance by which the deformable member can be deformed away from the tensile member, and thus the maximum distance between the tensile member and the side of the hole which can be spanned by the deformable member.

It is a particular advantage of this invention that the distance between adjacent buckling zones can be such as to permit the deformable member to deform into large voids, i.e. to span a cross-section considerably greater than the diameter of the drilled hole. In this way, the rock bolt can provide a sound anchorage in a hole despite the existence of one or more voids which might occur over a large proportion of the length of the bolt.

Usefully, each buckling zone comprises a section of the member having a reduced cross-sectional area.

Preferably, the tensile member carries indication means so that the existence of a void can be determined without need to remove the rock bolt.

In one embodiment, the rock bolt includes means to move the distal end of the deformable member relative to the distal end of the tensile member. In such an embodiment the relative "shortening" movement of the deformable member relative to the tensile member occurs at the distal end of the rock bolt; as a result, tightening of the rock bolt need not cause an increase in the distance by which the proximal end of the tensile member projects from the rock face. Preferably, the tensile member includes a threaded portion adjacent to its distal end, the deformable member including a cooperating threaded part adjacent to its distal end, the proximal end of the tensile member including means to impart rotation to the tensile member. By rotating the tensile member the cooperating threaded parts can cause movement of the distal end of the deformable member relative to the distal end of the tensile member.

In another embodiment, the means to reduce the distance between the respective ends of the deformable member includes a nut or threaded member which is rotatable upon a threaded part of the proximal end the tensile member, the distal end of the deformable member(s) being secured relative to the distal end of the tensile member, and the proximal end of the deformable member(s) being moved relative to the tensile member by way of rotation of the nut or threaded member.

Preferably, restraining means are provided at one or more spaced locations along the rock bolt, the restraining means being adapted to prevent deformation of the deformable member away from the tensile member at those locations.

There is also provided a method of using a rock bolt as herein defined, comprising the steps of {i} drilling a hole in a rock face, {ii} inserting a rock bolt as herein defined into the hole so that a part of the proximal end of the tensile member projects from the hole, {iii} placing a face plate over the projecting part, {iv} locating a nut member upon the projecting part so as to clamp the face plate against the rock face, and {v} rotating the nut member member so as to reduce the distance between the ends of the deformable member(s).

BRIEF DESCRIPTION OF THE DRAWINGS

The invention will now be described, by way of example, with reference to the accompanying drawings, in which.

DESCRIPTION OF THE EXEMPLARY EMBODIMENTS

Figure 1:
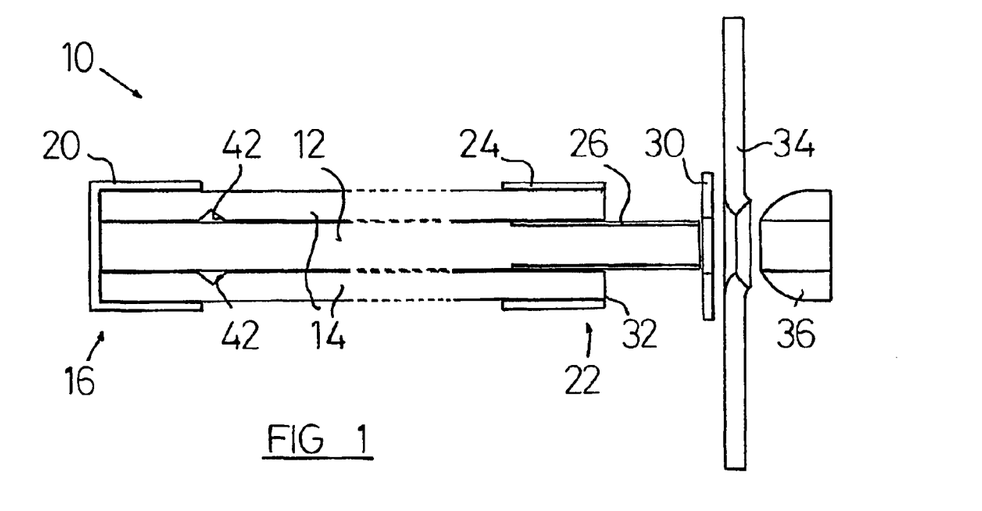
FIG. 1 is a side view of part of a first embodiment of rock bolt according to the invention.

The rock bolt 10 of FIG. 1 comprises a tensile member or bar 12, around which are grouped a number of deformable members 14 (in this embodiment there are six deformable members 14). The distal end 16 of the rock bolt, i.e. the end which will be inserted first into a drilled hole in the rock face, carries a clamp 20 by which the members 14 are permanently secured to the bar 12. The clamp 12 is pressed or swaged over the members 14 with sufficient force that they are maintained in permanent engagement with the bar 14 adjacent the clamp 20.

In other embodiments the clamp 20 may be replaced by a welded joint between the members and bar, or other permanent means of connecting the members and bar at their distal end. Adjacent the proximal end 22 of the bolt, i.e. the end of the bolt which will be adjacent the rock face in the fitted condition of the bolt, the members 14 are surrounded by a collar 24. The collar 24 is a sufficiently tight fit around the members 14 so that it is retained thereon (rather than sliding off the ends of the members during transportation, for example). However, the collar 24 is not sufficiently tight to clamp the members onto the bar at the proximal end. Alternatively stated, the collar 24 retains the members 14 adjacent the bar 12, but permits sliding movement of the bar relative to the members. The collar 24 may be welded to the members 14 if desired.

The bar 12 has a threaded length 26 at its proximal end 22. A plate washer 30 can be fitted over the threaded length 26, and can engage the proximal ends 32 of the members 14. In known fashion, a face plate 34 and hemispherical washer 36 can also be fitted over the threaded length 26, the face plate 34 having a part-circular formation which has a radius of curvature matching that of the hemispherical washer 36 whereby the face plate may lie at an angle other than perpendicular to the bar 12.

Following location of the plate washer 30, the face plate 34 and the hemispherical washer 36, a conventional nut (not shown) can be threaded onto the bar, and can be used to tighten the face plate 34 and the plate washer 30 against the ends 32 of the members 14.

Figure 3:
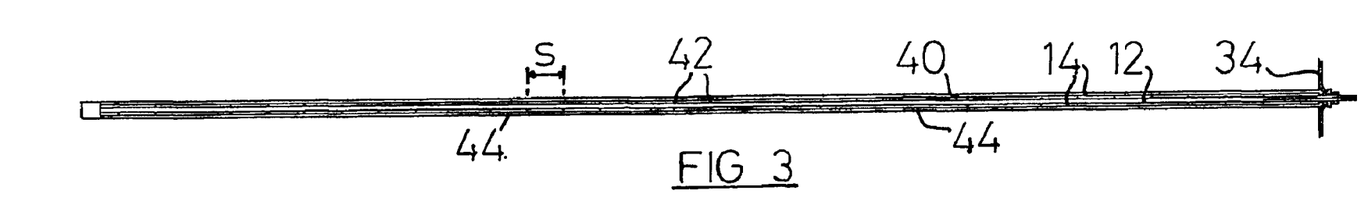
FIG. 3 is a side view of the rock bolt of FIG. 1 inserted into a drilled hole, and prior to deformation of the deformable members.
Figure 4:
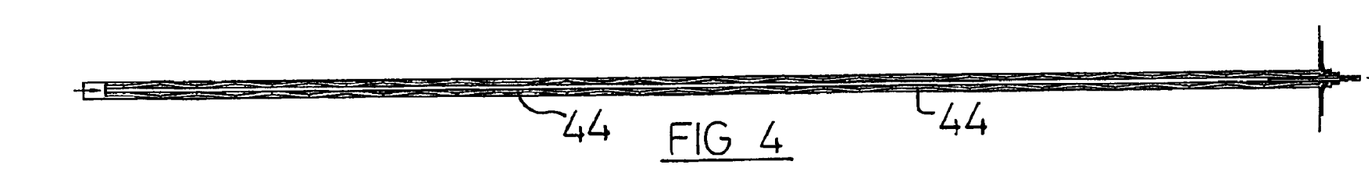
FIG. 4 is a side view as FIG. 3, but following deformation of the deformable members.

It will be understood that as the nut is tightened upon the bar, the distance between the ends of the members 14 (i.e. the effective length of the bar between its distal end and the plate washer 30) is reduced. However, since the members 14 are clamped between their distal ends and the plate washer 30, their length cannot change significantly, and following a certain length-wise reduction of the effective length of the bar 12 the members 14 are caused to buckle, i.e. forced to deform away from their previous substantially linear alignment. FIG. 3 shows the members 12 prior to buckling or deformation, whilst FIG. 4 shows the members after deformation has occurred, the members in FIG. 4 having been deformed into engagement with the inside surface 40 of the drilled hole throughout substantially the full length of the rock bolt 10.

In order to facilitate the deformation of the members, and to control the positions at which the deformation occurs, the members are each provided with spaced buckling zones 42. In the embodiment of FIGS. 1–5 the members 14 are formed from round solid bar, and the buckling zones comprise V-shaped cut-outs therein. Also, in this embodiment the cut-outs have a depth of approximately 40% of the diameter of the member, so that the effective cross-sectional area of the member is reduced by around one third. Also, the angle of the V is approximately 90° in this embodiment. The actual amount of material needing to be removed, and the precise form of the cut-outs or other means of providing the buckling zones, can be varied to suit the requirements of the operator, and will depend to large extent upon the base diameter of the member and the material from which it is formed. For a member of steel bar having a base diameter of 8 mm the localised reduction of the cross-sectional area by around one third is expected to ensure that the member will buckle only at the cut-outs 42, which therefore provide predetermined buckling zones.

Figure 2:
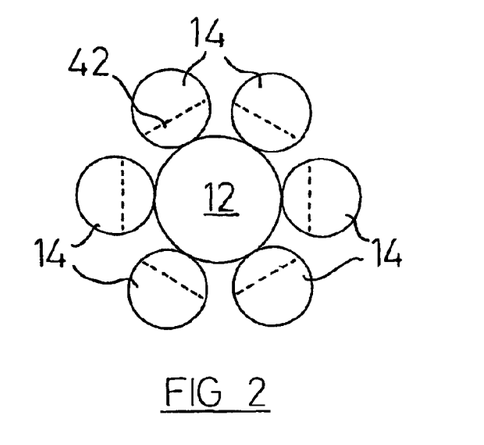
FIG. 2 is an cross-sectional view of the rock bolt of FIG. 1.

As seen in FIG. 2, the members 14 are arranged so that the cut-outs 42 are directed towards the bar 12, and this is believed to facilitate more controlled buckling radial to the bar. In other embodiments, however, the cut-outs may face away from the bar. It is not desired that the cut-outs face in other than a radial direction, since in such cases the deformation would likely occur in other than a radial direction, increasing the buckling required to engage the surface 40 of the drilled hole.

As is also seen in FIG. 2, the members 14 are separated around the bar 12. In this way they can each deform substantially independently of each other, the independent deformation being believed to be likely to result in a greater frictional engagement between the deformed members 14 and the surface 40 of the drilled hole.

It will be seen from FIG. 3 that there are many cut-outs 42 along the length of the members 14, each providing a buckling zone. The embodiment of FIG. 3 shows a rock bolt having a length of around three metres, and the separation s between adjacent cut outs 42 is around ten centimetres.

As will be seen in FIG. 4, when the nut has been tightened upon the threaded length 26 of the bar 12, the members 14 have all been deformed or buckled into engagement with the surface 40 for substantially the full length of the drilled hole. In this embodiment adjacent buckling zones have buckled in opposed directions, so that every other buckling zone is deformed outwardly (so that a part of the member adjacent the buckling zone engages the inside surface 40 of the drilled hole), whilst the intermediate buckling zones "deform inwardly". However, since the bar 12 resists the inward buckling of the members 14, the intermediate buckling zones remain in engagement with the bar 12.

It will be seen in FIG. 4 that the deformed members 14 each engage the surface 40 at fifteen spaced locations along the length of the rock bolt 10. Since there are six members 14, there is a total number of ninety engagement positions. In other embodiments each member may engage the surface 40 at more or fewer than fifteen locations, the number of engagement locations depending to large extent upon the length of the rock bolt and the spacing between the buckling zones.

The ability of the members to engage the surface 40 along substantially the full length of the drilled hole is very important in practice, since it allows the rock between the distal end 16 and the proximal end 22 to be clamped or held in compression, which as previously indicated is highly desirable in many practical applications.

Figure 5:
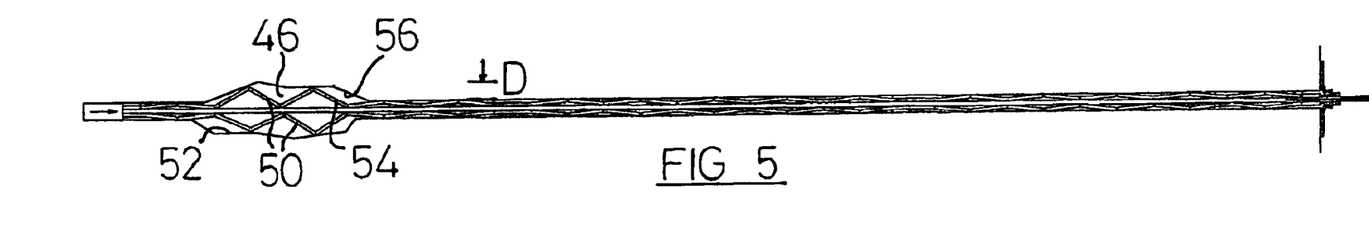
FIG. 5 is a side view as FIG. 4, but showing the deformation of the deformable members into a void.

FIGS. 3–5 also show the provision of two spaced restraining means or collars 44, which are identical to the collar 22 and serve to retain the members 14 in (sliding) engagement with the bar 12. Whilst the collars 44 reduce the number of possible engagement positions between the members 14 and the surface 40, their use is desirable in longer rock bolts since they facilitate easier transportation and handling of the rock bolt prior to insertion into the drilled hole, and will to some extent control the distribution of buckling. Whilst in this embodiment there are two intermediate collars 44 spaced apart by around one metre, in other embodiments there may be more or fewer intermediate collars.

The collars 44 in this embodiment, like the collar 22, are a sliding fit over the members 14, but may in alternative embodiments be welded or otherwise secured thereto.

As indicated above, in FIG. 4 alternate buckling zones have become deformed in opposed directions, so that the member engages the surface 40 adjacent every other buckling zone (except where a collar 44 prevents this). Also, each member has deformed in the same way at each buckling zone along the length of the rock bolt. FIG. 4 therefore represents an idealised situation. In practice, however, the buckling of each member 14 will be substantially random, and different members may deform outwardly at different positions along the length of the rock bolt. In addition, alternate buckling zones may not always deform in opposed directions, so that some part or parts of a member between adjacent buckling zones may lie along the bar 12, or may lie along the surface 40. Regardless of the specific engagement pattern which is created in a particular hole with a particular rock bolt, however, use of the rock bolt will result in engagement of the members 14 with the surface 40 at spaced positions over substantially the full length of the rock bolt, enabling the rock bolt to be anchored to the rock face and also to clamp the rock between its ends.

FIGS. 3 and 4 represent a perfect drilled hole, of the type which may be formed in very hard rock. However, in practice the rock may not be sufficiently hard throughout the length of the drilled hole to maintain a perfect hole, and a void or cavity 46 may be created such as that shown in FIG. 5. The void 46 may be naturally occurring or may be created by loose or fractured rock which breaks away from the surrounding rock during the drilling operation, and which rock is removed from the hole by the drill.

It is a particularly advantageous feature of the invention that the members 14 are able to occupy the void 46 as they are deformed (or rather as they are further-deformed beyond their deformation in FIG. 4), and the rock bolt 10 may provide an anchorage regardless of the existence of the void 46.

Thus, provided that the void dimension D is not too great a proportion of the spacing s between adjacent buckling zones 42, then the members 14 will be able to deform into the void 46, and in particular the parts 50 of the members 14 will be able to further-deform into engagement with the surface 52 of the void. The spacing s between the buckling zones 42 can of course be increased to increase the dimension of the voids which can be catered for, but this will result in fewer points of engagement between the members and the (normal drilled) surface 40. In any event, however, even if the dimension D of the void was too great to be engaged by the further-deformed parts of the members such as the parts 50, once the parts 50 have been further-deformed the rock bolt will be prevented from removal from the hole by the engagement of the further-deformed parts 50 with the void 46, i.e. the part 54 of the further-deformed part 50 will be caused to engage the edge 56 of the surface 52 if the rock bolt is caused to move outwardly of the hole.

It is another particularly advantageous feature that the existence of one or more voids can be determined without needing to inspect the drilled hole. Thus, in a perfect hole of a known diameter such as that of FIGS. 3 and 4, the nut will be able to be tightened by a known amount, and to a known point along the threaded length 26 of the bar 12, before a predetermined maximum torque is achieved. That point on the threaded length can be marked. In the presence of a void, however, and as shown in FIG. 5 in contrast to FIG. 4, the members 14 will deform further than they would in a perfect hole, and the nut must be tightened further along the threaded length 26 before the maximum torque will be reached. The passage of the nut beyond the mark on the threaded length 26 without the maximum torque having been achieved will be indicative of a void or voids.

If a void is detected in this way, and quite apart from the ability of the rock bolt to provide a good anchorage despite the presence of a void, it may be desirable to test the anchorage provided by the particular rock bolt, and it can readily be determined which of the rock bolts will require testing because of the presence of voids.

In addition, on some occasions it may occur that only some of the buckling zones buckle before the maximum torque is reached, for example the manufacturer may have made some of the recesses 42 too small so that the bar is able to resist the tendency to buckle. In such cases the nut will be able to move only a short distance along the threaded length before the maxmum torque is reached. An indication means can be provided to indicate the minimum distance the nut must be moved to ensure appropriate securement of the rock bolt. Thus, the threaded length might include two indicator lines, the first being required to be passed by the nut to ensure adequate securement of the rock bolt, the second only being passed in the presence of voids. If the tightened nut does not lie between the two indicator lines when the maximum torque is achieved, the rock bolt can be noted for testing, and another rock bolt inserted if required.

In the embodiment shown in FIGS. 1–5 the bar is manufactured from solid steel and is approximately 12 mm in diameter. In common with other designs, the threads of the threaded length 26 are formed by a rolling or pressing operation, though in other embodiments the threads may be cut into the bar. The members 14 are also of steel bar, 8 mm in diameter. A steel bar of 12 mm diameter will be able to withstand a tensile load of several tonnes for example, and so the tension which can be applied to the bar 12, and so to the members 14, can be considerable. In other embodiments the bar is manufactured from solid steel of a different diameter, and diameters between approximately 12 mm and approximately 20 mm are expected to be appropriate.

In alternative embodiments the bar and/or the members may be made from other materials such as carbon fibre, glass fibre, plastics materials such as nylon for example, glass reinforced plastic, or other metals such as stainless steel. All of these alternatives would have the benefit of the avoidance of corrosion, and so might be preferred in situations where corrosion of a steel rock bolt might be expected and disadvantageous.

In one particular alternative embodiment the bar 12 is replaced by a multi-strand cable or wire. Such a cable would be more flexible than a solid bar and enable the rock bolt to follow a non-linear drill hole more easily. To reduce the distance between the ends of the members the cable could be clamped and pulled by hydraulic means for example (which means are known for the tensioning of such cables). The tensioned cable could be secured adjacent the face plate by a cable clamp or a suitable wedging means.

In the embodiment shown in FIGS. 1–5, the members 14 are initially substantially linear. However, in alternative embodiments the members may be pre-deformed into a slight zig-zag form, so as to induce buckling (or further buckling) in predetermined directions. Such pre-deformation will facilitate further buckling of the members, but will increase the diameter of the hole which is required to be drilled into the rock face (or alternatively will require a reduction in the cross-sections of the bar and/or members for the rock bolt to be fitted into a drilled hole of standard dimension).

Figure 6:
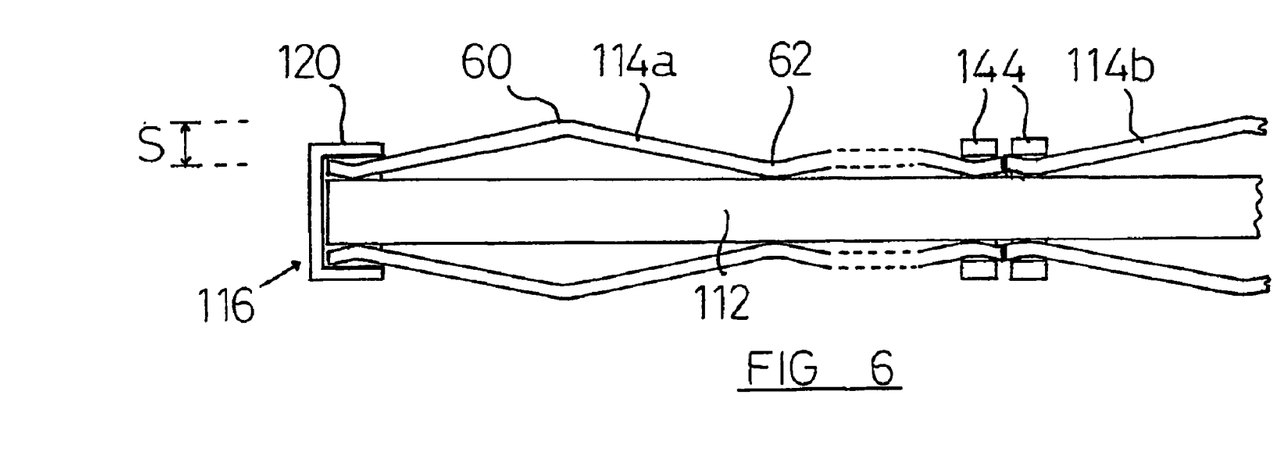
FIG. 6 is a side view of part of a second embodiment of rock bolt according to the invention.
Figure 7:
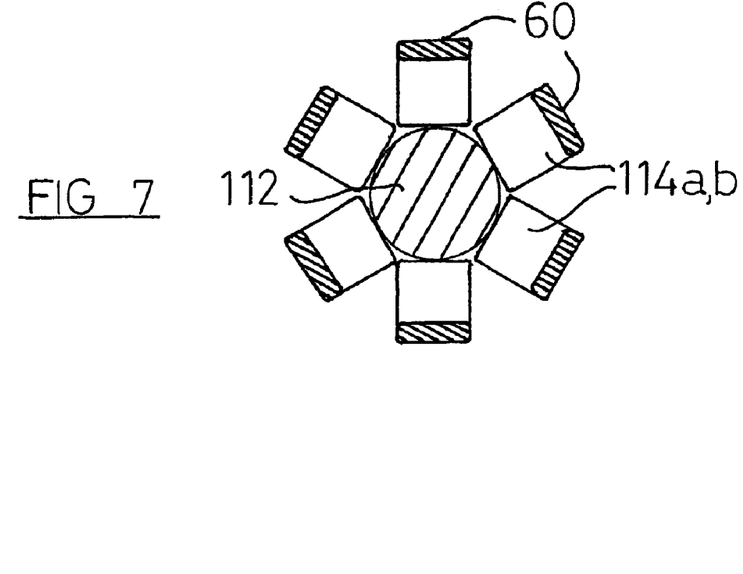
FIG. 7 is a cross-sectional view of the rock bolt of FIG. 6.
Figures 8, 9, 10:
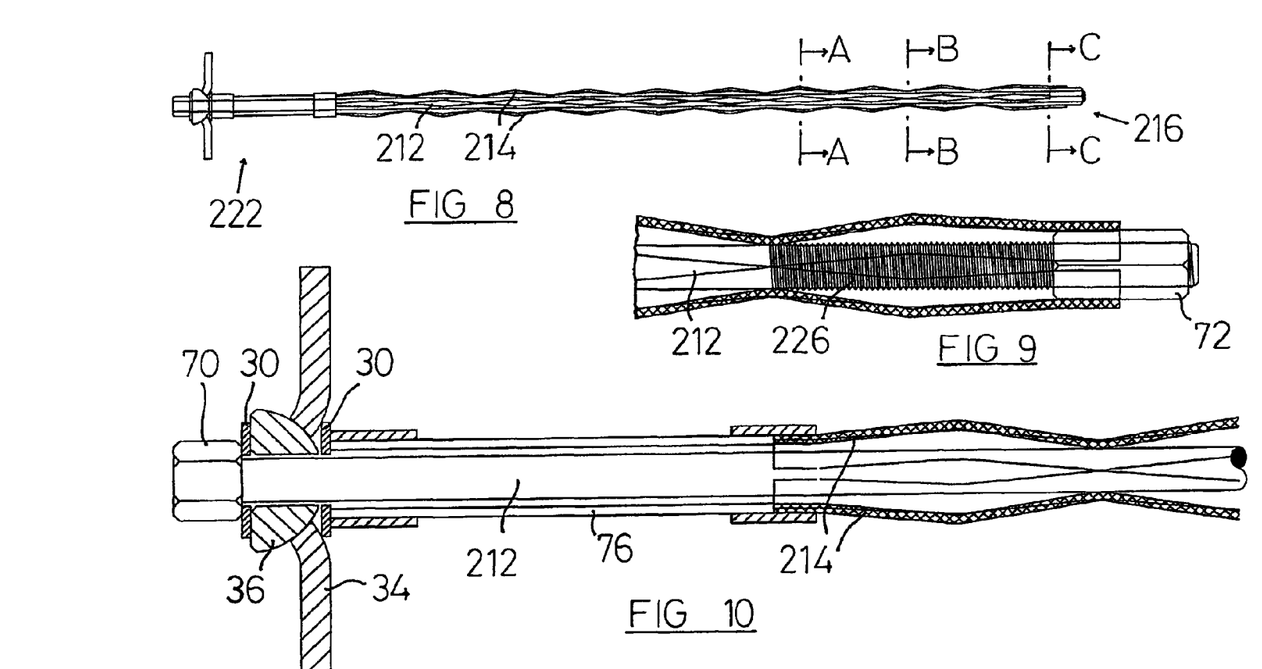
FIG. 8 shows a side view of a third embodiment of rock bolt according to the invention.
FIG. 9 shows a side view of the distal end of the rock bolt of FIG. 8.
FIG. 10 shows a side view of the proximal end of the rock bolt of FIG. 8.
Figure 11:
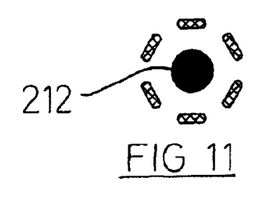
FIG. 11 is a cross-sectional view along the line A—A of FIG. 8.
Figure 12:
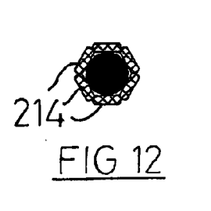
FIG. 12 is a cross-sectional view along the line B—B of FIG. 8.
Figure 13:
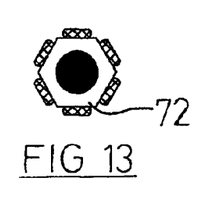
FIG. 13 is a cross-sectional view along the line C—C of FIG. 8.

Such an alternative embodiment is shown in FIGS. 6 and 7. In this embodiment the bar 112 is of round cross-section of 16 mm diameter (though diameters of approximately 12 mm to 20 mm could be used in such an embodiment), but the members 114 are of flat bar. In this embodiment the members 114 are made of bar of dimensions 3 mm by 10 mm, though alternative dimensions would also be suitable, such as 5 mm by 12 mm for example.

As shown, the members 114 have been previously pressed into a shallow zig-zag form, having peaks 60 and troughs 62. It is arranged that the lateral spacing s between the peaks and the troughs is substantially the same as the diameter of an equivalent round bar, so that the rock bolt can be fitted into a drilled hole of corresponding diameter. Alternatively, of course, the form and dimensions of the members, including the spacing s, can be chosen to suit the requirements of the particular application, and the hole will be drilled to the appropriate diameter.

The external surface of the peaks of the members can if desired in alternative embodiments be roughened or formed into a toothed or claw formation to dig into the surface 40. The distal end 116 of the bar 112 and the distal ends of the members 114 are securely held together by a clamp 120. If desired, the outside diameter of the clamp can be increased into approximate conformity with the peaks 60 of the members 114, and this may render the members 114 less liable to damage during handling and transportation.

In the embodiment of FIGS. 6 and 7 there are six members 114 arranged around the bar 112. It is an additional feature of this particular embodiment that the individual members 114 are not as long as the bar 112, and in particular the members are arranged into discrete bundles or sections, one section comprising the six members 114a, the next section comprising the six members 114b and so on as required to span the length of the bar 112. Thus, if the rock bolt is desired to fit into a three metre drilled hole, the bar will be slightly greater than three metres long (so that a part of its threaded end can project from the hole), and three discrete member sections, each of one metre length, can be fitted thereto. It is not necessary that the adjacent ends of the discrete member sections be secured together, since in use the adjacent ends will be forced into engagement as the bar 112 is tensioned.

Respective ends of the members 114a, 114b in each of the adjacent member sections are held in sliding engagement adjacent the bar 112 by a collar 144, preventing the respective ends of the members 114a,b from being deformed at the ends. As with the clamp 120, the collars 144 can be increased in diameter to closely match the diameter of the peaks 60, if desired.

The modular arrangement is particularly advantageous for longer rock bolts, perhaps exceeding the lateral dimension of the work space from which the rock bolt is to be fitted (e.g. the rock bolt may be six metres long but require to be fitted into the roof of a tunnel only three metres high). In such an application it would be necessary also that the bar 112 be made up in sections also, with each section of the bar being held together sufficiently securely to resist the applied tension force, or else that the bar be flexible, e.g. of multi-strand cable form as described above.

The one-metre long member sections could if desired or required have additional intermediate collars (such as the collars 144) to restrain the members 114a,b intermediate their ends. There could be sufficient intermediate collars for one collar to lie adajcent each of the troughs 62, for example.

It will be understood that when the bar 112 is tensioned, the respective ends of the members 114a,b are forced together, and the peaks 60 are forced to move further away from the bar 112, and specifically into engagement with the rock or earth surrounding the hole into which the rock bolt has been inserted. It is another possible feature of the modular arrangement that the cross-sectional dimensions of the members in each member section do not need to be the same, i.e. it could be arranged that the cross-sectional dimensions of the member section adjacent the distal end of the rock bolt be less than the cross-sectional dimensions of the members in the other member sections. Such an arrangement would result in the members adjacent the distal end of the rock bolt deforming into engagement with the hole first, and this might increase the compression which can be applied to the rock between the distal and proximal ends of the rock bolt.

In the first and second embodiments described above, the tensile member 12, 112 has its distal end secured to the distal end of the deformable members 14, 114. When the rock bolt of such embodiments is tightened, the threaded length of the tensile member is caused to project further beyond the face plate and into the tunnel or chamber within the rock which the bolt is seeking to support. In the third embodiment of FIGS. 8–13 on the other hand, the "shortening" movement of the deformable members 214 relative to the tensile member 212 occurs at the distal end 216 of the rock bolt 210.

In the third embodiment, the tensile member 212 comprises a round bar, suitably of steel, which has a threaded length 226 adjacent its distal end. At the proximal end 222 of the rock bolt, when the rock bolt 210 has been located into a hole drilled into the rock (not shown), the tensile member or bar 212 has a first plate washer 30, a face plate 34, a hemispherical washer 36 and a second plate washer 30 fitted thereto. Subsequently, a nut member 70 is swaged, welded, or otherwise permanently secured to the proximal end of the bar 212. The nut 70 is secured to the bar 212 in such a way that rotation of the nut 70 will be imparted to the bar 212.

Accordingly, the nut member 70 need not be in threaded engagement with the bar 212. In another embodiment, however, the proximal end of the tensile member is threaded for a length corresponding approximately to the length of the nut member; the nut member is threaded thereonto in conventional fashion, and when the nut reaches the end of the threaded length continued rotation of the nut causes corresponding rotation of the tensile member.

In this embodiment the rock bolt has six deformable members 214 located around the bar 212. The deformable members are of steel strip (though other materials could be used as previously indicated) which are predeformed slightly so as to define the buckling zones. The distal end of the deformable members 214 are all permanently secured to a collar 72 which is internally threaded and cooperates with the threaded portion 226 of the bar 212, so that rotation of the bar 212 causes the collar 72 (and hence the distal ends of the deformable members 214) to move relative to the bar 212. In this way, rotation of the bar 212 can cause the distal ends of the deformable members to be pulled towards the face plate 34; since the proximal ends of the deformable members 214 cannot also move, the deformable members are caused to deform so that parts of them move into contact (or into increased contact) with the surface of the rock surrounding the rock bolt.

It will be understood that when the bar 212 is being rotated, the deformable members 214 may also rotate, so preventing any relative movement between the distal ends of the tensile member and deformable members. It is, however, expected that the rock bolt will engage the surface of the drilled hole sufficiently for the friction between the deformable members and the rock to allow relative rotation to be imparted. Clearly, once a part of one of the deformable members 214 has been deformed into engagement with the rock the likelihood of rotation of the deformable members is much reduced. If relative rotation cannot be imparted, then means may be provided (perhaps by way of an aperture in the face plate 34) forcibly to limit or prevent rotation of the deformable members.

In this embodiment, a sleeve 76 (in this case a steel tube) loosely surrounds the bar 212 between the proximal ends of the deformable members 214 and the face plate 34. The proximal ends of the deformable members 214 bear against the distal end of the sleeve 76. The sleeve 76 reduces the overall length of the deformable members 214, and in particular reduces the distance over which the deformable members can be deformed into contact with the rock, the sleeve 76 preventing the deformable members 214 engaging the rock at less than a predetermined distance away from the face plate 34. A sleeve such as this may be required when there is a risk of the rock adjacent to the surface fracturing when engaged by a deformable member. The sleeve is an optional feature suitable for use with any of the disclosed embodiments, and its length can be varied as desired to suit the particular application.

It will be understood that the sectional or modular arrangement described in relation to FIGS. 6 and 7 can of course be used with the embodiments of FIGS. 1–5 and FIGS. 8–13 if desired, and it will also be understood that many of the features and variants described for each embodiment may be utilised with the other embodiments described. A modular arrangement facilitates commonised manufacturing, i.e. it is possible for the manufacturer to make the member sections in one metre lengths and for the customer to specify the desired number of member sections for the desired length of rock bolt.

The members 14, 114, 214 can be replaced by an oval-profiled bar of steel, or another suitable profile of a metallic or non-metallic material. Also, in other embodiments there can be more or fewer than six members around the bar.

The rock bolt according to the invention is significantly simpler to fit than rock bolts requiring grout, and does not share the stated disadvantages of the other known grout-free designs. The rock bolt of the invention is suited to mechanised installation, for example a machine which drills the holes in the rock face may be fitted with a carousel containing rock bolts according to the invention, and the machine may insert a rock bolt into each hole immediately after the drill has been removed therefrom. The tightening of the nut upon the bar could also be mechanised, or an operator could follow the machine and carry out the necessary tightening of the nut.

It is another advantage of the rock bolt according to the invention that subsequent removal of the rock bolt may be achieved by removing the tension from the tensile member; even if this does not disengage the deformable members from the surface of the drilled hole it may reduce the frictional resistance to movement sufficiently to allow the rock bolt to be pulled (preferably by way of the deformable members) out of the hole.

Though it is not expected to be necessary, in some applications it might be desired to fill the hole with grout after the rock bolt 10 has been fitted (and tightened); the gaps between the members 14, 114 allows such grouting if this is desired. Clearly, subsequent removal of a grouted rock bolt will not be possible.

The principle of the invention, i.e. the tightening of a central bar, cable or other tensile member to deform one or more surrounding deformable members, could be utilised in other applications than those of the tunnelling and mining industries. For example, ground anchors are required in many applications to provide an anchorage point in surface earth or soil. A "rock bolt" according to the present invention could be used in such applications, and notwithstanding that the bolt may be anchored into earth as well as or instead of rock in such applications the term "rock bolt" will be used for such anchors, for simplicity. The invention might also be utilised in the piling and contruction industries to provide anchorage points in earth or rock.

Also, the invention may be utilised in ground stabilisation applications, in which "rock bolts" such as those described, perhaps up to six metres long (or even longer if required), can be used to secure rock and earth against unwanted movement.

In the applications of the invention previously described, the rock bolt is inserted into a hole drilled or otherwise formed in the rock and/or earth. In ground anchor applications, however, it may be that a relatively short "rock bolt" is to be located in relatively soft earth; in such applications the distal end of the rock bolt can be fitted with a sharpened point or blade, allowing a suitable forcing or percussion tool to drive the rock bolt directly into the earth.

What is claimed is:

1. A rock bolt for fitment into a blind hole and to be secured therein by engagement with a surface of the hole, the rock bolt comprising an elongate tensile member and at least two separate elongate deformable members located radially around the tensile member, an end of each elongate deformable member being movable relative to the tensile member in order to reduce the distance between the respective ends of the deformable members and to deform at least part of each deformable member away from the tensile member and into engagement with the surface of the hole in use, each deformable member in use engaging the surface of the hole at a plurality of spaced positions.

2. A rock bolt according to claim 1 in which the deformable members are almost as long as the tensile member, and in which the deformation can occur over substantially the full length of the deformable members.

3. A rock bolt according to claim 1 in which the deformable members are independently deformable.

4. A rock bolt according to claim 1 in which each deformable member has at least one buckling zone provided therein, the buckling zone(s) being adapted to induce buckling deformation at certain locations of the deformable member.

5. A rock bolt according to claim 1 in which the deformable members are initially non-linear.

6. A rock bolt according to claim 1 having at least one restraining member, the restraining member being adapted to prevent deformation of the deformable members away from the tensile member adjacent the restraining member.

7. A rock bolt according to claim 1 in which said end of each elongate deformable member which is movable relative to the tensile member is the distal end of the deformable members.

8. A rock bolt according to claim 7 in which the tensile member includes a threaded portion adjacent to its distal end, the deformable members being connected to a cooperating threaded part adjacent to its distal end.

9. A rock bolt according to claim 1 in which the distal end of each of the deformable members is secured relative to the distal end of the tensile member.

10. A rock bolt according to claim 9 in which said end of each elongate deformable member which is movable relative to the tensile member is the proximal end of the deformable member, and the rock bolt includes a threaded member which is rotatable upon a threaded portion of the proximal end of the tensile member.

11. A method of using a rock bolt comprising an elongate tensile member and at least two separate elongate deformable members located radially around the tensile member, the method including the steps of {i} drilling a blind hole in a rock face, the hole having a surface, {ii} inserting the rock bolt into the hole so that a part of the proximal end of the tensile member projects from the hole, {iii} placing a face plate over the projecting part, {iv} locating a nut member upon the projecting part so as to clamp the face plate against the rock face, and {v} rotating the nut member so as to reduce the distance between the ends of the deformable members and deform at least part of each deformable member away from the tensile member and into engagement with the surface of the hole, each deformable member engaging the surface of the hole at a plurality of spaced positions.

* * * * *

UNITED STATES PATENT AND TRADEMARK OFFICE
CERTIFICATE OF CORRECTION

PATENT NO. : 6,929,424 B2
DATED : August 16, 2006
INVENTOR(S) : Hindle, David John It is certified that error appears in the above-identified patent and that said Letters Patent is hereby corrected as shown below:

<u>Title page,</u>
Item [57], ABSTRACT,
Line 7, "rack bolt" should be -- "rock bolt" --.

Signed and Sealed this

Sixth Day of June, 2006

JON W. DUDAS
*Director of the United States Patent and Trademark Office*